US010592764B2

United States Patent
Loginov et al.

(10) Patent No.: US 10,592,764 B2
(45) Date of Patent: Mar. 17, 2020

(54) RECONSTRUCTING DOCUMENT FROM SERIES OF DOCUMENT IMAGES

(71) Applicant: ABBYY Production LLC, Moscow (RU)

(72) Inventors: Vasily Loginov, Moscow (RU); Ivan Zagaynov, Dolgoprudniy (RU); Irina Karatsapova, Balashiha (RU)

(73) Assignee: ABBYY Production LLC, Moscow (RU)

( * ) Notice: Subject to any disclaimer, the term of this patent is extended or adjusted under 35 U.S.C. 154(b) by 113 days.

(21) Appl. No.: 15/717,155

(22) Filed: Sep. 27, 2017

(65) Prior Publication Data
US 2019/0065880 A1    Feb. 28, 2019

(30) Foreign Application Priority Data

Aug. 28, 2017   (RU) ................................ 2017130308

(51) Int. Cl.
| | |
|---|---|
| *G06K 9/32* | (2006.01) |
| *G06K 9/46* | (2006.01) |
| *G06K 9/62* | (2006.01) |
| *G06T 7/00* | (2017.01) |
| *G06K 9/20* | (2006.01) |

(52) U.S. Cl.
CPC ........... *G06K 9/3283* (2013.01); *G06K 9/325* (2013.01); *G06K 9/4628* (2013.01); *G06K 9/6274* (2013.01); *G06K 2009/2045* (2013.01); *G06K 2209/01* (2013.01); *G06T 7/97* (2017.01)

(58) Field of Classification Search
None
See application file for complete search history.

(56) References Cited

U.S. PATENT DOCUMENTS

| | | | |
|---|---|---|---|
| 7,457,477 B2 | 11/2008 | Petschnigg et al. | |
| 8,339,508 B2 | 12/2012 | Levy | |
| 9,111,402 B1* | 8/2015 | Krishnan | ........... G07C 9/00158 |
| 9,129,177 B2 | 9/2015 | Baik et al. | |

(Continued)

OTHER PUBLICATIONS

Block, Marco et al, "Multi-Exposure Document Fusion Based on Edge-Intensities", Date of Conference: Jul. 26-29, 2009, 5 pages.

*Primary Examiner* — Kevin Ky
(74) *Attorney, Agent, or Firm* — Lowenstein Sandler LLP (57) ABSTRACT

Systems and methods for reconstructing a document from a series of document images. An example method comprises: receiving a plurality of image frames, wherein each image frame of the plurality of image frames contains at least a part of an image of an original document; identifying a plurality of visual features in the plurality of image frames; performing spatial alignment of the plurality of image frames based on matching the identified visual features; splitting each of the plurality of image frames into a plurality of image fragments; identifying one or more text-depicting image fragments among the plurality of image fragments; associating each identified text-depicting image fragment with an image frame in which that image fragment has an optimal value of a pre-defined quality metric among values of the quality metric for that image fragment in the plurality of image frames; and producing a reconstructed image frame by blending image fragments from the associated image frames.

20 Claims, 9 Drawing Sheets (56) References Cited

U.S. PATENT DOCUMENTS

| | | | |
|---|---|---|---|
| 9,240,049 B2 * | 1/2016 | Ciurea | H04N 13/232 |
| 9,275,448 B2 | 3/2016 | Maltz et al. | |
| 9,332,156 B2 | 5/2016 | Majewicz et al. | |
| 9,392,185 B1 * | 7/2016 | Kumar | H04N 5/2354 |
| 2003/0076408 A1 * | 4/2003 | Dutta | G06T 5/006 |
| | | | 348/61 |
| 2006/0078200 A1 * | 4/2006 | Koyama | G06K 9/00456 |
| | | | 382/181 |
| 2018/0121756 A1 * | 5/2018 | Becker | G06K 9/00469 |

* cited by examiner

```
add:
reddened reddening embedded embedding embeddedness Seddon Embedded
shedding wedded wedding disembedded embeddings Wedderburn
Subolevsembedding Reddy meddle Meddahi Freddy Embedding embeddings
imbedding quencheddisorder
edf:
Ledford heedful feedforward Feedforward
edg:
acknowledgment acknowledge Acknowledgements Routledge acknowledgement
Knowledge acknowledging acknowledged acknowledges Acknowledging fledgling
knowledgeable acknowledgements unacknowledged ledgescapes knowledgeably
Acknowledgments nonknowledge preknowledge hedging Hedging hedge hedged
wedges pledged hedger unhedged hedges Hedge wedgeable Wedging edger
Acknowledgments xxv Hedges edgy Acknowledgments xii ledger Hedgeh
vertexedge edgeI edgeIs
edh:
redhat Fredholm
edn:
edn connectedness coveredness handedness boundedness embeddedness
relatedness Pednault Wednesday Interconnectedness interconnectedness
situatedness rootedness uprootedness mindedness orientedness
projectedness unbiasedness posedness Closedness closedness
cointegratedness needn 4connectedness
edk:
Gangakhedkar Mukhedkar Ambedkar
edl:
contentedly discontentedly uninterruptedly ReducedIsotropicCompliance
ReducedIsotropicStiffness ReducedIsotropicStiffnessI needless supposedly
avowedly repeatedly decidedly allegedly admittedly Needless Relatedly
undoubtedly purportedly wholeheartedly markedly wickedly undeservedly
Allegedly boundedly Riedle Feedlot Schnedlitz Fiedler unexpectedly
unboundedly unterschiedlichen Repeatedly Medley Undoubtedly sqlitedll
Admittedly
edt:
edx
edc:
Fedchenko
edv:
adventure Medvec
edb:
Redberg feedback Feedback Supportedby Swedberg nonfeedback
edn:
edn connectedness coveredness handedness boundedness embeddedness
relatedness Pednault Wednesday Interconnectedness interconnectedness
situatedness rootedness uprootedness mindedness orientedness
projectedness unbiasedness posedness Closedness closedness
cointegratedness needn 4connectedness
eds:
Friedman Redmond Redmondian Redman Redmiles Freedman
equ:
subsequently equipment frequently consequences frequented inconsequent
consequently Consequently requirements equivalent Subsequently equipped
equipage equipages equality equally equals inadequacy unequal inadequate
adequately equations inadequately equaled equilibrium required
equivalence equating equivalents infrequently sequential sequentially
requires equalise Requirements request requiring inadequacies
(consequences) (Consequences) (Consequence) requisite Adequate
equifinality inconsequential
```

RECONSTRUCTING DOCUMENT FROM SERIES OF DOCUMENT IMAGES

REFERENCE TO RELATED APPLICATIONS

The present application claims the benefit of priority under 35 U.S.C. § 119 to Russian Patent Application No. 2017130308 filed Aug. 28, 2017, the disclosure of which is incorporated herein by reference in its entirety for all purposes.

TECHNICAL FIELD

The present disclosure is generally related to computer systems, and is more specifically related to systems and methods for image acquisition and pre-processing for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for reconstructing a document from a series of document images may comprise: receiving, by a computer system, a plurality of image frames, wherein each image frame of the plurality of image frames contains at least a part of an image of an original document; identifying a plurality of visual features in the plurality of image frames; performing spatial alignment of the plurality of image frames based on matching the identified visual features; splitting each of the plurality of image frames into a plurality of image fragments; identifying one or more text-depicting image fragments among the plurality of image fragments; associating each identified text-depicting image fragment with an image frame in which that image fragment has an optimal value of a pre-defined quality metric among values of the quality metric for that image fragment in the plurality of image frames; and producing a reconstructed image frame by blending image fragments from the associated image frames.

In accordance with one or more aspects of the present disclosure, an example system for reconstructing a document from a series of document images may comprise: a memory; a processing device, coupled to the memory, the processing device configured to: receive a plurality of image frames, wherein each image frame of the plurality of image frames contains at least a part of an image of an original document; identify a plurality of visual features in the plurality of image frames; perform spatial alignment of the plurality of image frames based on matching the identified visual features; split each of the plurality of image frames into a plurality of image fragments; identify one or more text-depicting image fragments among the plurality of image fragments; associate each identified text-depicting image fragment with an image frame in which that image fragment has an optimal value of a pre-defined quality metric among values of the quality metric for that image fragment in the plurality of image frames; and produce a reconstructed image frame by blending image fragments from the associated image frames.

In accordance with one or more aspects of the present disclosure, an example computer-readable non-transitory storage medium may comprise executable instructions that, when executed by a processing device, cause the processing device to: receive a plurality of image frames, wherein each image frame of the plurality of image frames contains at least a part of an image of an original document; identify a plurality of visual features in the plurality of image frames; perform spatial alignment of the plurality of image frames based on matching the identified visual features; split each of the plurality of image frames into a plurality of image fragments; identify one or more text-depicting image fragments among the plurality of image fragments; associate each identified text-depicting image fragment with an image frame in which that image fragment has an optimal value of a pre-defined quality metric among values of the quality metric for that image fragment in the plurality of image frames; and produce a reconstructed image frame by blending image fragments from the associated image frames.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for reconstructing a document from a series of document images.

In the following description, the term "document" shall be interpreted broadly as referring to a wide variety of text-carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

An OCR system may transform a document image into a computer-readable and searchable format comprising the textual information extracted from the image of the paper document. However, the OCR process may be hindered by various image defects, such as visual noise, poor focus or sharpness of the image, glares, blur, etc., which may be routinely caused by the spatial instability of the image acquiring device, inadequate illumination, incorrectly chosen shutter speed or aperture, and/or other conditions and attenuating circumstances. In order to compensate for image defects, the OCR-quality document image may be reconstructed by processing a series of document images (e.g., a sequence of video frames or still image frames) of the document. Notably, such a series of frames may not always be acquired with a fixed position of the image acquiring device with respect to the original document and/or unaltered image capturing conditions, while those factors may render unfeasible producing of an OCR-quality document image based on the acquired series of frames.

The systems and methods described herein represent significant improvements over common image acquisition and pre-processing methods, by yielding an OCR-quality image via processing series of frames that may be acquired with variable positions of the image acquiring device with respect to the original document and/or under variable image capturing conditions (such as illumination, focus, shutter speed, aperture, etc.). Therefore, the systems and methods described herein may be efficiently utilized for acquiring and processing document images by mobile computing devices (such as smartphones, tablets, and the like) equipped with still image and/or video cameras. The image processing effectively improves image quality by compensating for various image aberrations caused by glaring, shadows, blur, defocus and/of noise. The image quality produced by the systems and methods of the present disclosure allows significant improvement in the OCR accuracy over various common image acquisition methods.

In an illustrative example, a computer system implementing the methods described herein may acquire a plurality of image frames, such that each image frame contains at least a partial image of the original document. The image processing may involve the image registration, e.g., by spatially aligning the image frames based on matching of certain visual features identified within each of the image frames. Each of the plurality of image frames may then be split into a plurality of overlapping or non-overlapping image fragments and one or more text-depicting image fragments among the plurality of image fragments may be identified. Each identified text-depicting image fragment may be associated with an image frame in which that image fragment has an optimal value of a certain quality metric among values of the quality metric for that image fragment in all the image frames. The reconstructed image frame may be produced by blending image fragments from the associated image frames, as described in more details herein below.

Various aspects of the above referenced methods and systems are described in details herein below by way of examples, rather than by way of limitation.

Figure 1:
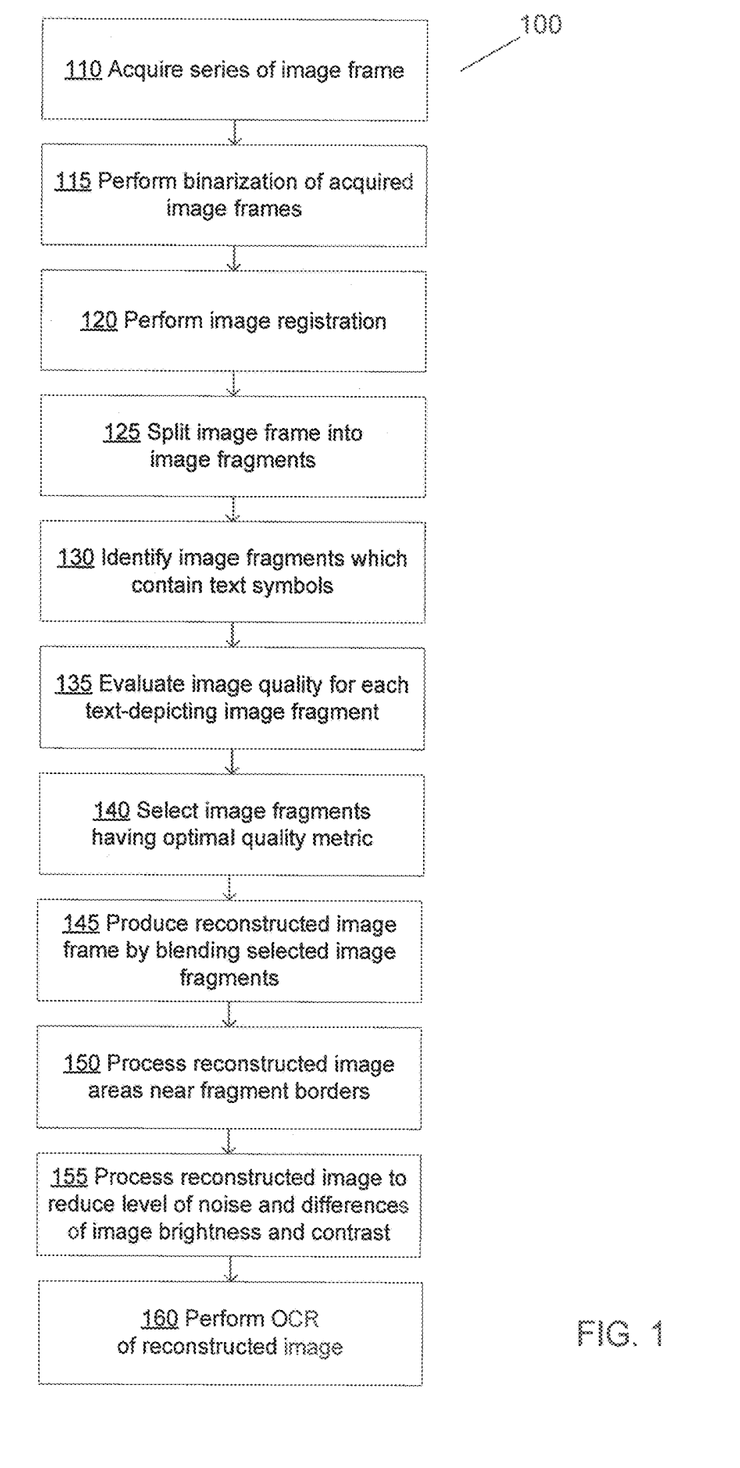
FIG. 1 depicts a flow diagram of one illustrative example of a method for reconstructing a document from a series of document images, in accordance with one or more aspects of the present disclosure.

FIG. 1 depicts a flow diagram of one illustrative example of a method 100 for performing OCR of a series of images comprising text symbols, in accordance with one or more aspects of the present disclosure. Method 100 and/or each of its individual functions, routines, subroutines, or operations may be performed by one or more processors of the computer system (e.g., example computer system 800 of FIG. 8) executing the method. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

Figure 2:
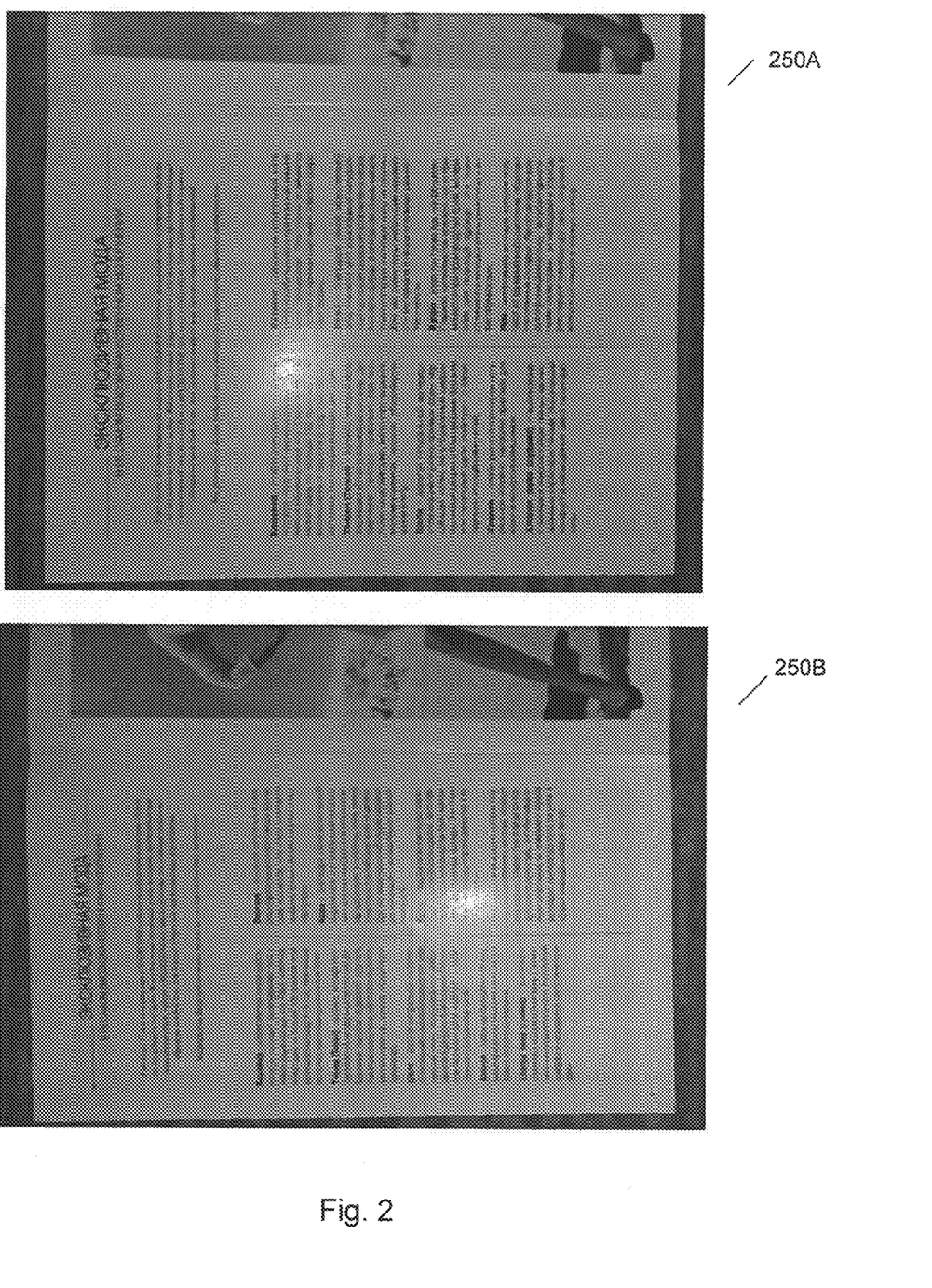
FIG. 2 schematically illustrates two document images which have been acquired with different positions of the image acquiring device which caused different position of the glare spots within the image.

At block 110, the computer system implementing the method may acquire a series of image frames (e.g., a sequence of video frames or still image frames) of the original document. The frames may include at least partially overlapping document image fragments, and may differ by the position of the image acquiring device with respect to the original document and/or by image capturing conditions. Varying the position of the image acquiring device with respect to the original document may produce differences in the image scale, different image optical distortions caused by variations in the shooting angle, different positions of the original document within the image frame and/or different positions of various visual artifacts, such as glare or shadows. It should be noted that the variations of the document position with the image frame may be caused not only by movements of the image acquiring device, but also by movements of the original document with respect to the field of view (FOV) of the image acquiring device. FIG. 2 schematically illustrates two document images 250A, 250B that have been acquired with different positions of the image acquiring device which caused different position of the glare spots within the image.

Variations in image capturing conditions may be caused by differences in shutter speed, aperture, focus, and/or presence of external objects that at least partially cover the original document, which may result in variations in image brightness, sharpness, glaring, blur, and/or other image features and visual artifacts.

Acquiring the series of images may be performed by still image or video cameras. In an illustrative example, some of the images of the series of images may be acquired using a built-in or external illumination device (e.g., a flash), while the remaining images of the series may be acquired under the ambient light without engaging additional illumination devices. Alternatively, all images of the series may be acquired using a built-in or external illumination device (e.g., a flash) or under the ambient light without engaging additional illumination devices.

In certain implementations, operation of the illumination device may be manually controlled by the user. Alternatively, the illumination device may be activated by the computer system implementing the method, e.g., based on a pre-defined number of images to be acquired with or without engaging the illumination device. The computer system may have certain pre-configured settings, at least some of which may be user-modifiable, e.g., the number of images to be acquired under different image capturing conditions.

In certain implementations, the computer system may implement the multi-shot image acquiring mode (i.e., acquiring multiple images which is triggered by a single push of the shutter button). In certain implementations, the computer system may implement automatic exposure bracketing mode, which involves automatically changing the image acquiring parameters (e.g., the exposure) in acquiring the series of images.

In certain implementations, the position of the image acquiring device with respect to the original document and the shooting angle may be manually controlled by the user (e.g., based on the visual feedback received via the viewfinder). Alternatively, the computer system implementing the method may direct the user to move the image acquiring device with respect to the original document and/or to change the shooting angle in order to produce the series of image frames in which various defects and visual artifacts (which may be caused e.g., by shades, glaring, external objects that may at least partially cover the original document) have different positions within the frames, thus allowing the original document to be reconstructed based on the acquired series of image frames.

In certain implementations, the computer system may utilize various user interface devices (e.g., the viewfinder, one or more light emitting diode (LED) indicators, and/or audio output) to advise the user of suggested image acquiring modes and parameters (e.g., adjusting the position of the image acquiring device, the original document, or an external light source). In an illustrative example, the computer system implementing the method may detect various visual defects within a previously acquired image frame and/or within the real-time image data received from the viewfinder, and may provide a visual feedback to the user by highlighting or otherwise visually indicating the detected defective areas in the viewfinder. In certain implementations, the image analysis may involve edge detection, which may be performed by analyzing the second order derivatives of the pixel brightness. Lack of contrasting edges in certain image areas may indicate a high level of noise (e.g., caused by defocus) or a strong degree of blur. In an illustrative example, profiles of the second order derivatives of brightness in the direction of the brightness gradient may be produced for the pixels residing in the visual proximity of the detected edges. Parameters of these profiles may be analyzed and compared to known profiles in order to determine the type of distortion (e.g., blur or defocus), the rate of distortion, and certain parameters of the distortion (e.g., the direction of the blur). The profile parameters may include the mean value, the dispersion, the asymmetry coefficient, the absolute values of local minima and maxima, etc. In certain implementations, the computer system may employ one or more trainable classifier functions which may process the profiles of the second order derivatives of brightness in the direction of the brightness gradient and yield the degree of certain aberration type found in the image.

In an illustrative example, the second order derivatives of pixel brightness may be determined by applying a Laplacian filter or its approximation. To reduce the effect of noise, the image may be smoothed before applying a Laplacian filter, e.g., by a Gaussian smoothing filter, a median filter, a box-filter, an adaptive median filter, and/or other smoothing methods. In certain implementations, a combined filter, such as Laplacian of Gaussian (LoG) or Difference of Gaussians (DoG) filter may be used. The filter type and the filtering parameters may be selected based on characteristics of a given class of images or an image acquiring device in order to improve the quality and efficiency of defect detection.

The detected image defects may be reflected by the visual feedback provided to the user of the image acquiring device. The visual feedback may entail highlighting, color-filling, or otherwise visually indicating in the viewfinder the image areas containing the detected image defects. In certain implementations, the color utilized for the image area filling may indicate the aberration type, while the brightness may indicate the image distortion rate caused by the corresponding image defect. In an illustrative example, the user may react to the visual feedback by moving the image acquiring device in an attempt to minimize the number and/or total area of the highlighted image defects.

Alternatively, the computer system implementing the method may automatically initiate acquiring the second and subsequent frames of the series. In an illustrative example, the computer system may analyze the real time image data that is fed to the viewfinder and acquire the next image frame when the document position within the image frame or the point of view (POV) changes by more than a pre-determined threshold. Such a threshold may be specified, e.g., as a pre-defined ratio (e.g., 10% or 20%) of the image frame size or the document size along a given spatial direction. In certain implementations, the changes of the document position within the image frame may be detected by applying the methods of the epipolar geometry, which may involve comparing projections of certain feature points (e.g., document corners) within two consecutively acquired image frames.

At block 115, the computer system may perform binarization of the acquired image frames. A binary image is a digital image that has only two possible values for each pixel, i.e., zero or one. Typically, the values of bit pixels are interpreted as corresponding to black and white colors, though any other two colors can be used for the visualization of binarized images.

In an illustrative example, image binarization may involve converting the original color image into a grayscale image in which each pixel is encoded by its luminance value, and comparing each pixel to a pre-defined or dynamically adaptable threshold luminance value in order to yield a black or white pixel. The dynamically-adaptable threshold may be produced by a clustering algorithm which adjusts the binarization threshold value based on inspecting a grayscale tone distribution profile of one or more images.

At block 120, the computer system may perform the image registration, i.e., the spatial alignment of two or more images of the document based on matching visual features. In certain implementations, the base image in the series may be identified (e.g., as the image having the best sharpness in the series), and the remaining images may be transformed in order to be spatially aligned with the identified base image.

Figure 3:
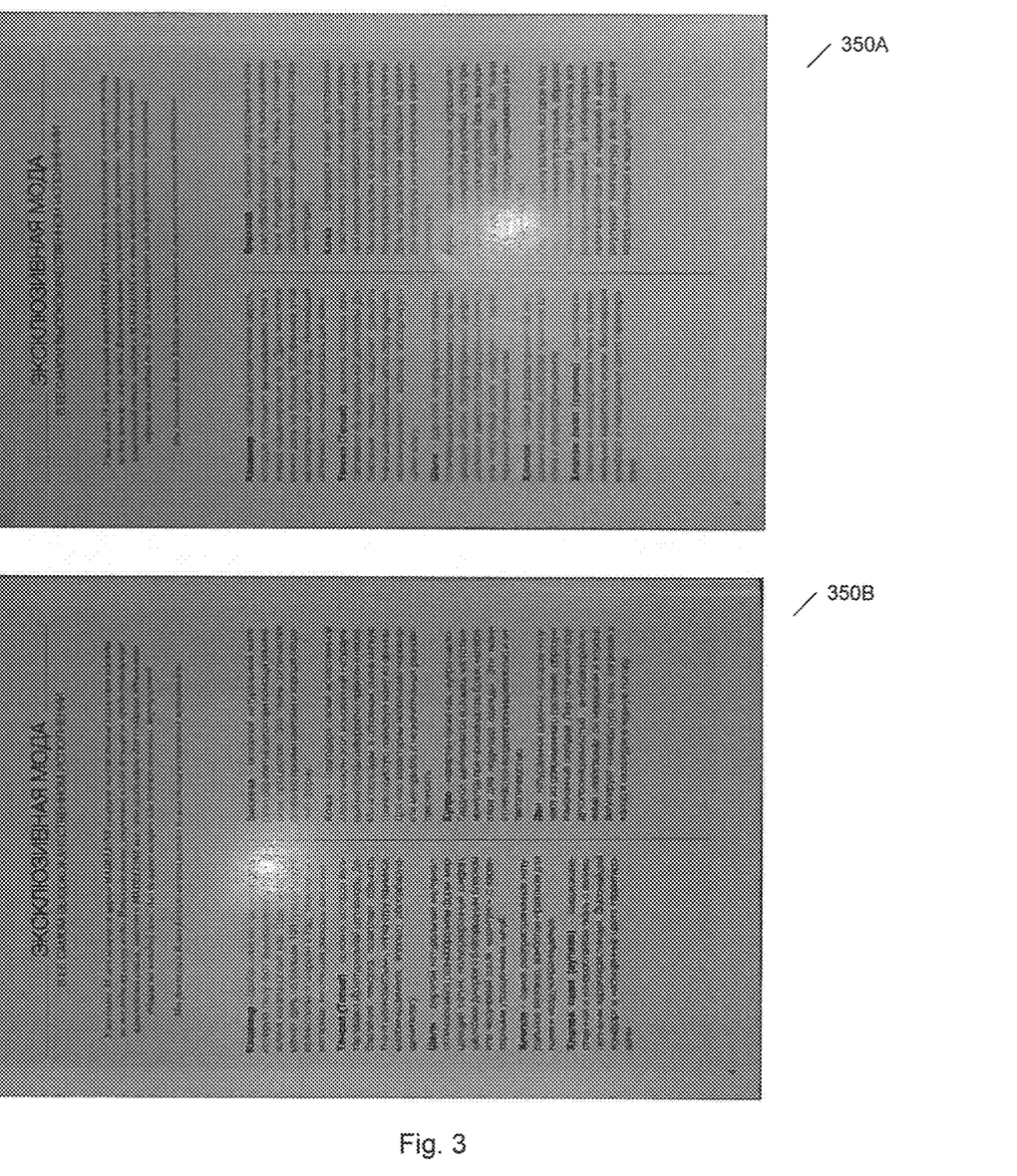
FIG. 3 schematically illustrates two document images which have been produced from the respective original images by cropping and adjusting the aspect ratio.

The image registration may involve converting the acquired images to specified dimensions and/or aspect ratios. The dimensions and/or aspect ratios may be specified by the user in the application settings or selected by the user from a list of standard dimensions and aspect ratio values. FIG. 3 schematically illustrates two document images 350A and 350B which have been produced from the respective original images 250A and 250B by cropping and adjusting the aspect ratio.

The image registration may further involve applying projective transformations to the acquired images. "Projective transformation" herein refers to a transformation that maps lines to lines, but does not necessarily preserve parallelism. A projective transformation can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein (x,y) and (X,Y) represent coordinates of an arbitrary chosen point in the first image and the second image, respectively. The transformation coefficients $Ax_1$, $Ax_2$, $Ax_3$, $Ax_4$, $Ay_1$, $Ay_2$, $Ay_3$, and $Ay_4$ may be determined based on known coordinates of at least four base points in each of the two images, which would produce a system of eight equations with eight variables. Once the transformation coefficients have been determined, the equations (1) and (2) may be applied to coordinates of an arbitrary chosen point in the first image in order to determine coordinates of the corresponding point in the second image.

In an illustrative example, if a whole document fits within the image frame, the projective transformations may be applied to the document corners, which may be identified as intersections of detected document edges. Alternatively, if the whole document does not fit within the image frame, the projective transformations may be applied to certain feature points. Feature points may be located in the areas of sharp changes of the brightness gradient, and thus are usually found in the visual proximity of corners, spots, or edges. In various implementations, feature points may be detected, e.g., by applying the Hess matrix, Haar filters, Harris corner detector, DoG, etc.

For each detected feature point, one or more descriptors, represented by vectors describing the image data in the visual proximity of that feature point, may be determined. To facilitate the feature point matching across multiple images, feature point descriptors may be chosen to be invariant to the illumination, noise, camera position and rotation, and/or other factors that may cause image distortion. In various illustrative examples, one or more methods may be employed for identifying feature points and producing their corresponding descriptors, e.g., scale-invariant feature transform (SIFT), Affine-SIFT (ASIFT), speeded up robust features (SURF), Oriented FAST and Rotated BRIEF (ORB), etc.

Responsive to identifying feature points and determining their respective descriptors in one image frame, the corresponding feature points may be identified in another image frame, e.g., by applying kd-tree method, hierarchical k-means tree method, and/or other methods. A projective transformation may be applied to the identified corresponding feature points in order to spatially align the two images. A similar procedure may be performed for all images of the series.

The image registration errors, i.e., spatial displacements of certain feature points in one or more images with respect to the base image, may be compensated based on a pre-determined or dynamically adjustable error threshold, e.g., by smoothing the field of motion vectors describing the two-dimensional transitions of certain image fragments (also referred to as "macroblocks." The smoothing may be performed by applying one or more filters of various types (e.g., convolution filters with a large centered window) to the motion vectors.

At block 125, the computer system may split the image frame into a plurality of overlapping or non-overlapping fragments. In certain implementations, the fragments may have the rectangular shape and be of the same or different sizes. Alternatively, other shapes and various sizes may be employed for splitting the image frames into fragments, e.g., rhombs, parallelograms, hexagons, etc. In certain implementations, the geometric shapes may be rotated by a certain angle, e.g., by 30, 45, 60, or 90 degrees. The image may be split into fragments of different shapes, e.g., squares and rectangles. The fragment dimensions may be chosen so that the fragment would comprise at least a certain amount of textual information (e.g., at least a pre-defined number of text lines and/or at least a pre-defined number of symbols per line), while limiting the fragment size in order to allow adequate detection and processing of local image defects. In an illustrative example, the fragment width may correspond to a pre-defined number of the text lines (e.g., two or three lines). In another illustrative example, the fragment length may correspond to a pre-defined number of the text symbols (e.g., five to seven symbols).

At block 130, the computer system may identify the image frame fragments which contain text symbols. In an illustrative example, the computer system may determine the image contrast as the difference between the maximum and minimum brightness values within the image fragment, and may compare the determined image contrast to a pre-defined threshold contrast value; the image fragment is likely to contain text symbols if the image contrast exceeds the threshold contrast value. In another illustrative example, the computer system may determine the ratio of the text-valued pixels (e.g., having the value of binary "1") to the total number of pixels comprised by the image fragment and compare the determined ratio to a per-defined threshold ratio; the image fragment is likely to contain text symbols if the ratio falls below the threshold ratio. In certain implementations, one or more of the specified criteria need to be satisfied for at least one image of the series in order for the image fragment to be classified as text-depicting image fragments.

At block 135, the computer system may evaluate the image quality for each image fragment. The image quality factors being evaluated may include the image sharpness, the level of noise, the image contrast, the optical distortion level (i.e., curvature of straight lines), and/or presence of certain visual artifacts. In an illustrative example, the image sharpness and/or the level of noise may be reflected by the degree of deviation of the brightness profile (e.g., the second order derivatives of brightness in the direction of the brightness gradient) from a step function. In another illustrative example, the level of the image blur may be reflected by the mean distance from the zero crossing point to a local extremum of the second order derivatives of the image brightness. In another illustrative example, the noise level may be reflected by the mean and/or the variance of the image brightness. In another illustrative example, the glare presence and level may be identified by identifying and analyzing connected components within the image. "Connected component" herein refers to a set of pixels that are linked to each other by paths which are wholly comprised by that component.

In certain implementations, the image quality may be evaluated by a trainable classifier function which may process certain image parameters and yield the degree of certain aberration type found in the image. The image parameters may include various profiles of the second order derivatives of the image brightness in the direction of the brightness gradient, such as the mean value, the dispersion, the asymmetry coefficient, the absolute values of local minima and maxima, parameters of the identified connected components, etc. In an illustrative example, two or more trainable classifiers may be cascaded, such that the output of one classifier is fed to another classifier.

In certain implementations, two or more image aberration detectors that detect various aberration types may be applied to the image simultaneously of sequentially. The image quality may be represented by a sum of weighted levels of each detected aberration type.

In certain implementations, the image quality may be represented by the ratio of the dispersion of the Background and Text classes produced by performing Otsu's binarization of the image to the full dispersion of the image fragment:

$$R=\sqrt{(w_1 * w_2)} * (M_2-M_1)/\sigma, \quad (1)$$

where $M_1$ is the average brightness of the pixels for which the Otsu's binarization threshold is not exceeded, $w_1$ is the ratio of the number of such pixels to the total number of pixels in the image fragment, $M_2$ is the average brightness of the pixels for which the Otsu's binarization threshold is exceeded, $w_2$ is the ratio of the number of such pixels to the total number of pixels in the image fragment, and $\sigma$ is the interclass standard deviation (i.e., the square root of the interclass dispersion).

Alternatively, the image quality may be represented by an estimate of the image OCR accuracy, which may be produced by a trainable convolutional neural network (CNN). A CNN is a computational model based on a multi-staged algorithm that applies a set of pre-defined functional transformations to a plurality of inputs (e.g., image pixels) and then utilized the transformed data to perform pattern recognition. A CNN may be implemented as a feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation In an illustrative example, a CNN may include multiple layers of various types, including convolution layers, non-linear layers (e.g., implemented by rectified linear units (ReLUs)), pooling layers, and classification (fully-connected) layers. A convolution layer may extract features from the input image by applying one or more learnable pixel-level filters to the input image. In an illustrative example, a pixel-level filter may be represented by a matrix of integer values, which is convolved across the dimensions of the input image to compute dot products between the entries of the filter and the input image at each spatial position, thus producing a feature map that represents the responses of the filter at every spatial position of the input image.

A non-linear operation may be applied to the feature map produces by the convolution layer. In an illustrative example, the non-linear operation may be represented by a rectified linear unit (ReLU) which replaces with zeros all negative pixel values in the feature map. In various other implementations, the non-linear operation may be represented by a hyperbolic tangent function, a sigmoid function, or by other suitable non-linear function.

A pooling layer may perform subsampling to produce a reduced resolution feature map while retaining the most relevant information. The subsampling may involve averaging and/or determining maximum value of groups of pixels.

In certain implementations, convolution, non-linear, and pooling layers may be applied to the input image multiple times prior to the results being transmitted to a classification (fully-connected) layer. Together these layers extract the useful features from the input image, introduce non-linearity, and reduce image resolution while making the features less sensitive to scaling, distortions, and small transformations of the input image.

The output from the convolutional and pooling layers represent high-level features of the input image. The purpose of the classification layer is to use these features for classifying the input image into various classes. In an illustrative example, the classification layer may be represented by an artificial neural network that comprises multiple neurons. Each neuron receives its input from other neurons or from an external source and produces an output by applying an activation function to the sum of weighted inputs and a trainable bias value. A neural network may include multiple neurons arranged in layers, including the input layer, one or more hidden layers, and the output layer. Neurons from adjacent layers are connected by weighted edges. The term "fully connected" implies that every neuron in the previous layer is connected to every neuron on the next layer.

The edge weights are defined at the network training stage based on the training dataset. In an illustrative example, all the edge weights are initialized to random values. For every input in the training dataset, the neural network is activated. The observed output of the neural network is compared with the desired output specified by the training data set, and the error is propagated back to the previous layers of the neural network, in which the weights are adjusted accordingly. This process may be repeated until the output error falls below a predetermined threshold.

At block 140, the computer system may select, for each image fragment, the image frame in which that image fragment has the optimal (maximal or minimal) value of a chosen image quality metric among the values of the image quality metric for that image fragment in all image frames of the series of image frames. In certain implementations, the image quality metric may be evaluated only for the image frames in which that image fragment has been classified as containing text symbols, thus excluding the image frames in which that image fragment has been classified as containing no text symbols. Therefore, if a given image fragment has been classified as containing text symbols in only one frame of the series of image frames, that frame will be selected without evaluating the image quality metric. Conversely, if a given image fragment has been classified as a background image fragment (i.e., image fragment containing no text symbols) in all frames of the series of image frames, any frame will be selected without evaluating the image quality metric, as the image quality is irrelevant for background image fragments.

In certain implementations, the image quality metric may be represented by the above-described equation (1) which evaluates the ratio of the dispersion of the Background and Text classes produced by performing Otsu's binarization of the image to the full dispersion of the image fragment. Alternatively, the image quality may be represented by an estimate of the image OCR accuracy, which may be produced by a CNN, as described in more detail herein above.

At block 145, the computer system may produce the reconstructed grayscale or binarized image frame by blending the image fragments from the respective associated image frames that have been selected by the operations described herein above with reference to block 145. In an illustrative example, the image frame is split into three image fragments 1, 2, and 3 comprised by the series of two frames 1 and 2. The image fragment 1 has the quality metric value of 10 in the frame 1 and the quality matric value of 50 in the frame 2. The image fragment 2 has the quality metric value of 100 in the frame 1 and the quality matric value of 80 in the frame 2. The image fragment 3 has the quality metric value of 50 in the frame 1 and the quality metric value of 80 in the frame 2. Therefore, the reconstructed image frame may be produced by combining the image fragment 1 from the frame 2, the image fragment 2 from the frame 1, and the image fragment 3 from the frame 2. Notably, in real life implementations the number of image fragments may be substantially larger than in the above-described illustrative scenario.

Figure 4:
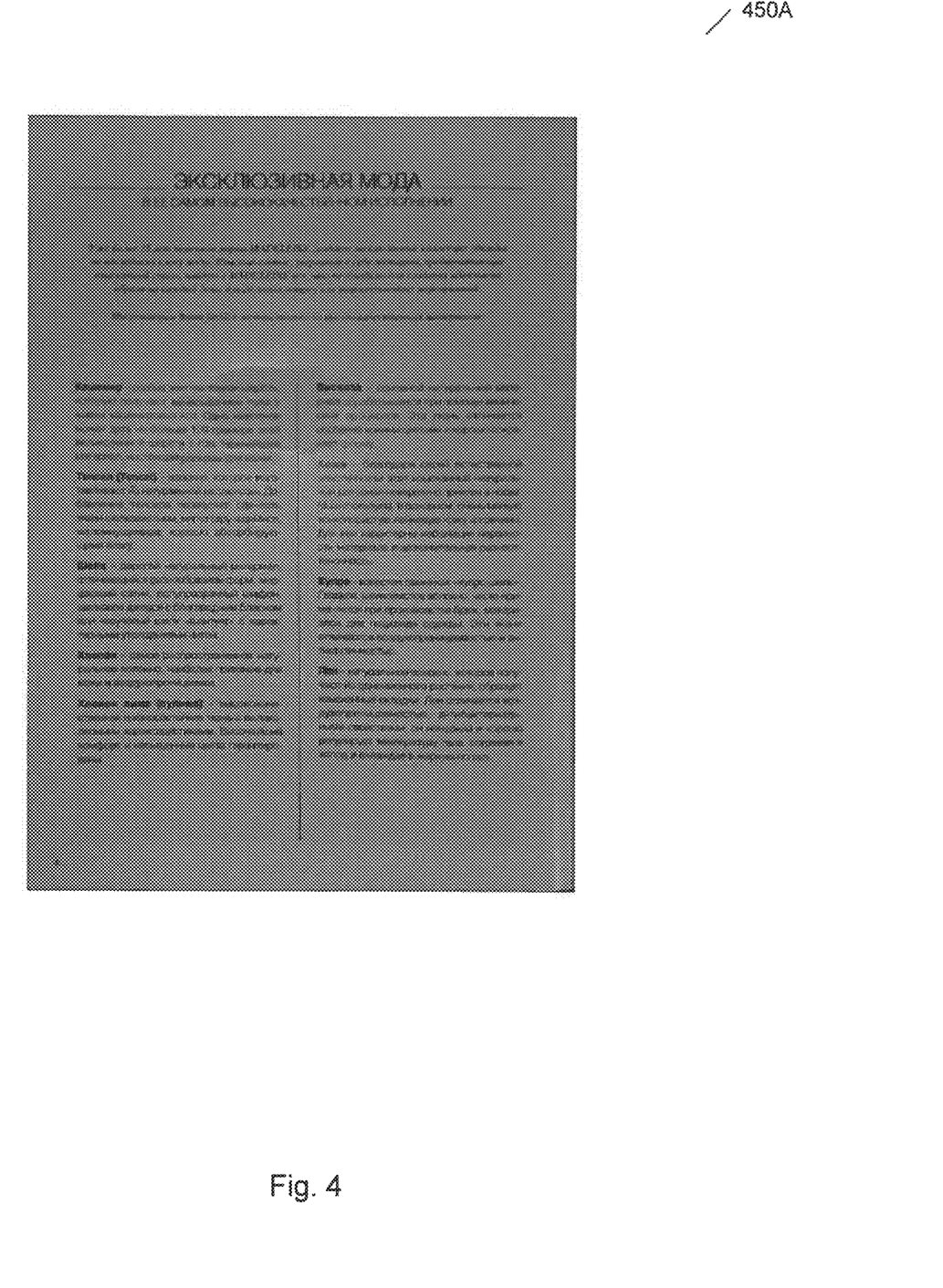
FIG. 4 schematically illustrates the image which has been produced by combining two images of FIG. 3 such that the glare spot in the first image has been filled by a corresponding image fragment from the second image.

In an example illustrated by FIG. 4, the image 450 has been produced by combining the images 350A-350B of FIG. 3 such that one or more image fragments comprising the glare spot in the image 350B has been filled by a corresponding one or more image fragments from the image 350A.

Figure 5A:
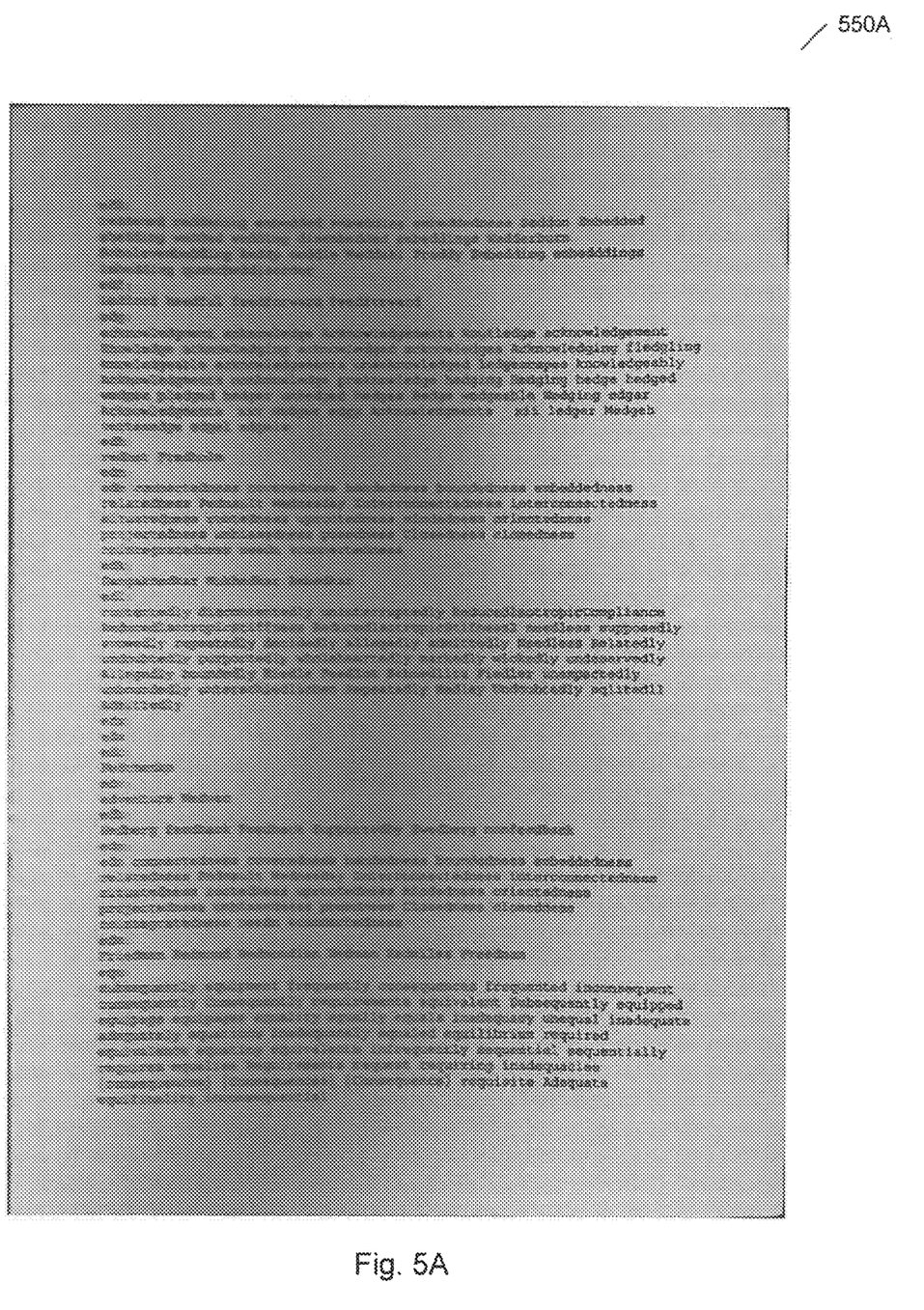
FIGS. 5A-5B illustrate two document images having different blurred areas.
Figure 5B:
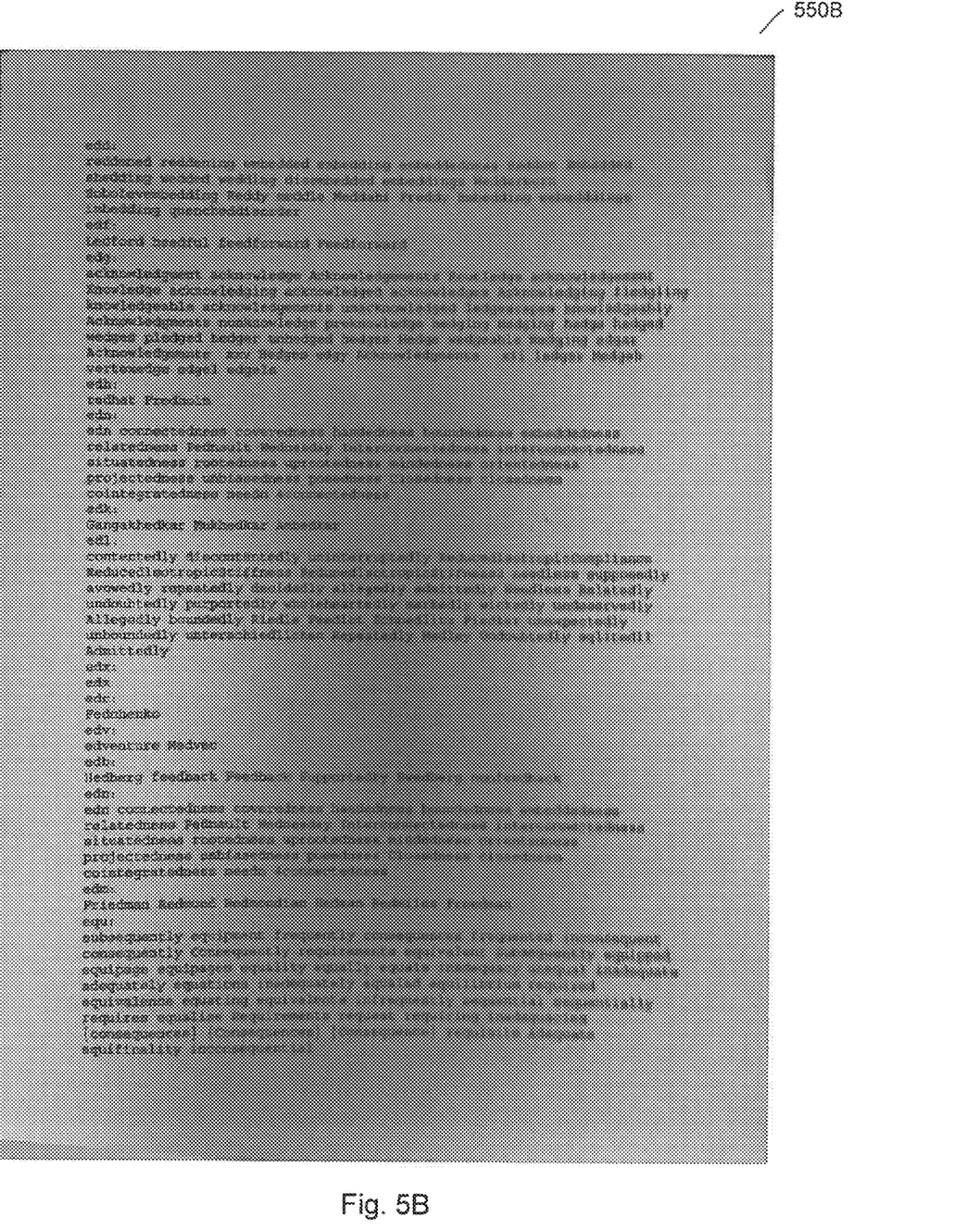
Figure 6:
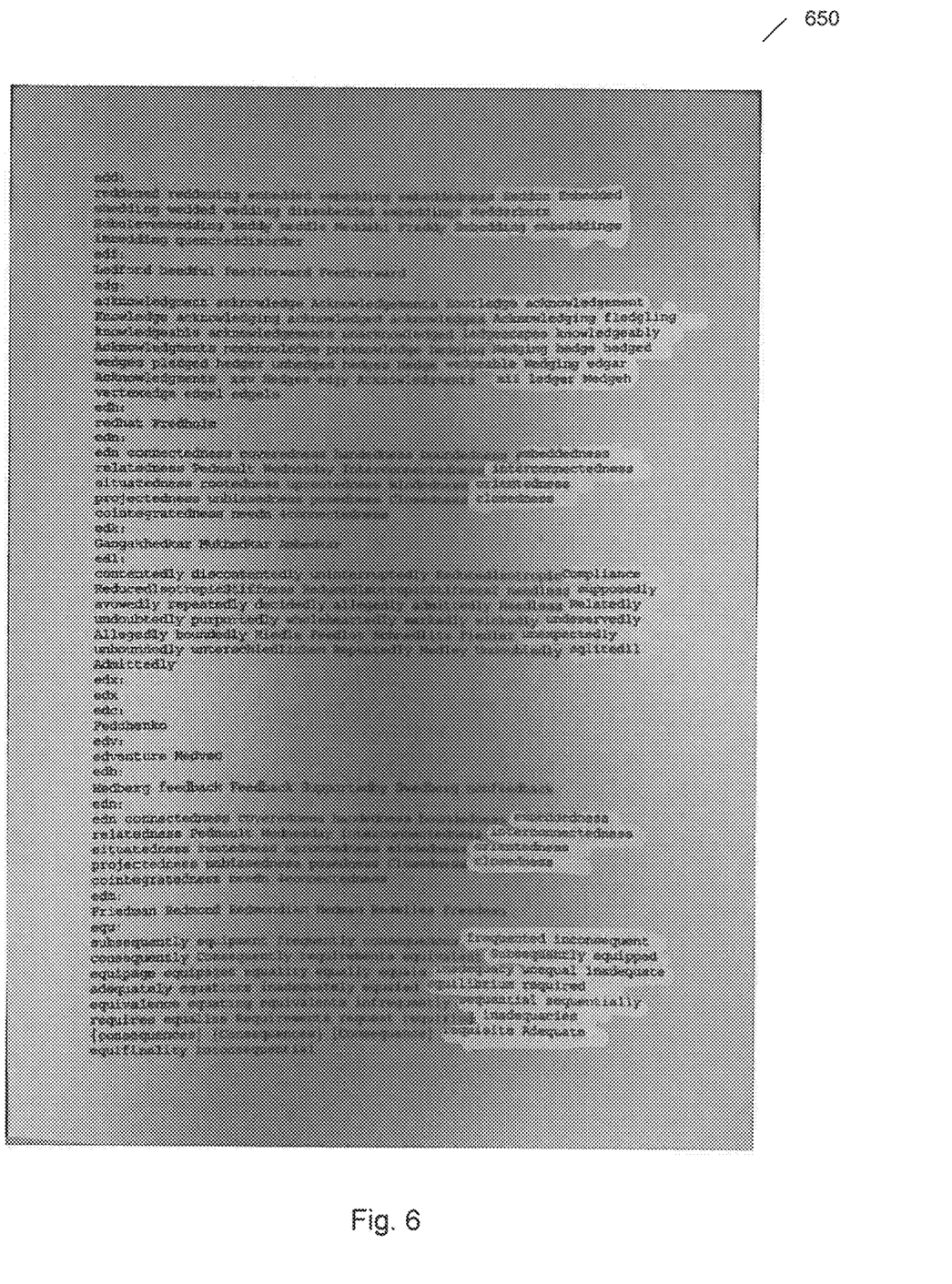
FIG. 6 schematically illustrates the image which has been produced by combining two images of FIGS. 5A-5B such that the blurred area in the first image has been filled by a corresponding image fragment from the second image.

In another example, the image 550A of FIG. 5A comprises a blurred area in the left part of the image, while image 550B of FIG. 5B comprises a blurred area in the right part of the image. Accordingly, the image 650 of FIG. 6 has been produced by combining the images 550A-550B of FIGS. 5A-5B such that one or more image fragments comprising the blurred area in the image 550B has been filled by a corresponding one or more image fragments from the image 550A.

At block 150, the computer system may process one or more areas of the reconstructed image that reside in the proximity of inter-fragment borders, in order to compensate for undesirable visual effects that may have been introduced by the blending operation of block 145. Possible undesirable visual effects include merging two or more connected components residing on the opposite sides of a border between two blended fragments, which may adversely affect the OCR quality.

In certain implementations, the computer system may perform selective blending of image fragments from different image frames. The selective blending may involve identifying and analyzing connected components which reside in the proximity of the inter-fragment borders or traverse such borders. Each identified connected component may be expanded to cover a larger area such that each group of related symbols (e.g., a word) depicted by the image would likely be covered by a single connected component. For each identified connected component, one of the two image fragments residing on each side of the inter-fragment border may be selected, by associating each pixel of the connected component with the image in which that pixel has the maximum sharpness. The image fragment that has been associated with the maximum number of the pixels may be selected as the source image fragment for the connected component, and the area covered by the connected component may be copied to the final reconstructed image from the selected image fragment.

In certain implementations, the computer system may implement the interactive Graph Cuts method for interactive image segmentation, which may involve accepting, via a suitable user interface, the user's selection of certain pixels as "object" or "background" to provide hard constraints for segmentation. Additional soft constraints may incorporate boundary and region information. Graph cuts (e.g., subsets of edges) are constructed in order to identify the globally optimal segmentation of the N-dimensional image, which gives the best balance of boundary and region properties among all segmentations satisfying the constraints.

Additionally or alternatively, various other techniques may be implemented by the computer system for processing the areas of the reconstructed image residing in the proximity of inter-fragment borders.

At block 155, the computer system may further process the reconstructed image in order to reduce the level of noise and/or reduce possible differences in the image brightness and contrast of different image fragments. In an example illustrated by FIG. 7, the image 750 has been produced by post-processing image 650 of FIG. 6 using one or more post-processing methods described herein below.

Figure 7:
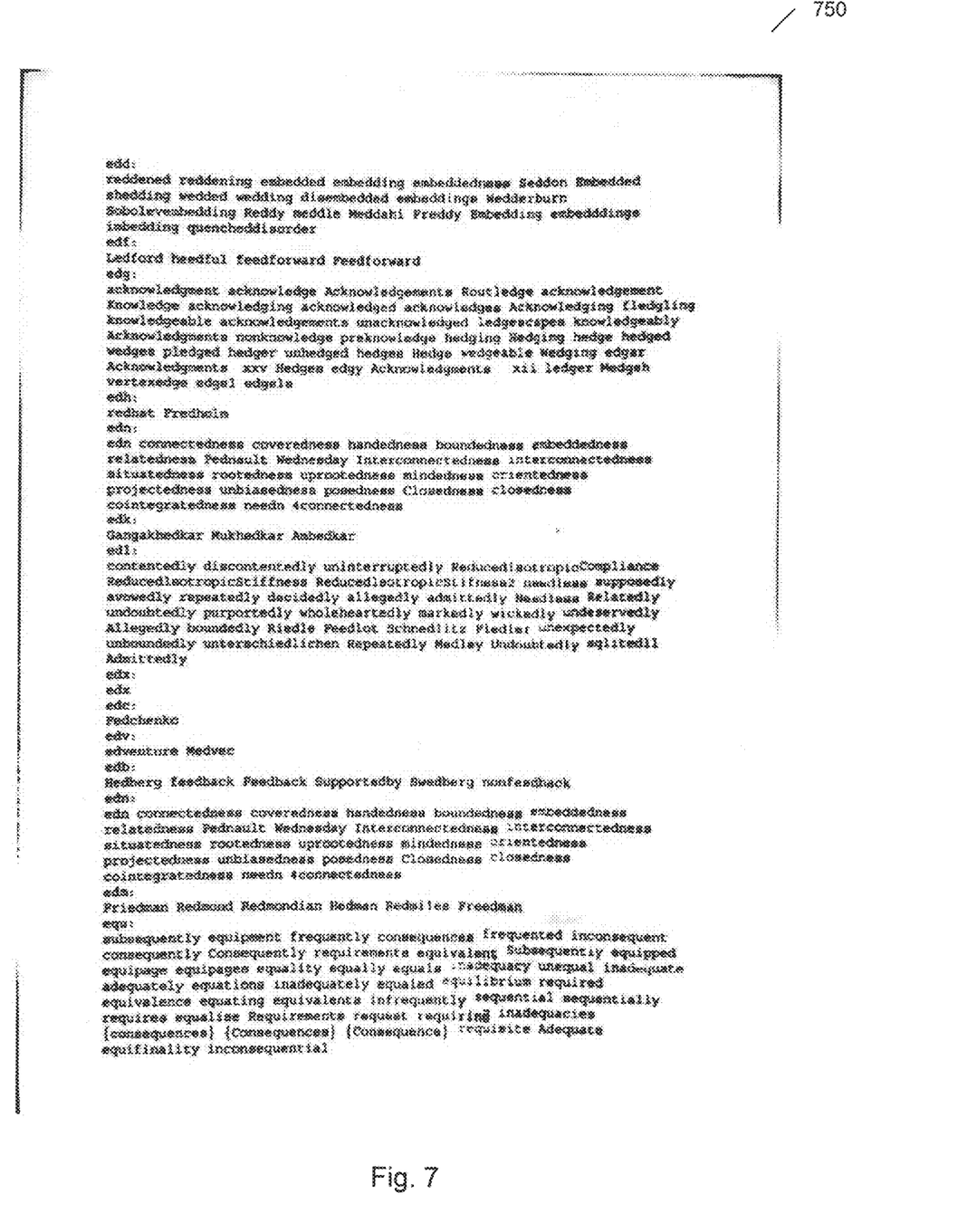
FIG. 7 schematically illustrates the image which has been produced by post-processing the image of FIG. 6.

In certain implementations, the computer system may apply one or more filters to the reconstructed image in order to reduce the noise level while preserving the image contrast and sharpness. In an illustrative example, a bilateral filter that uses Gaussian-distribution-based weighting may be applied:

$$I^{filtered}(x) = (\Sigma I(x_i) f_r(\|I(x_i)-I(x)\|) g_s(\|x_i-x\|))/W_p, \text{ where } x_i \in \Omega,$$

where the normalization term $W_p = \Sigma f_r(\|I(x_i)-I(x)\|) g_s(\|x_i-x\|)$ ensures that the filter preserves the image energy, and where $I^{filtered}$ is the filtered image;

I is the original input image to be filtered;

x are the coordinates of the current pixel to be filtered;

$\Omega$ is the window centered in x;

$f_r$ is the range kernel for smoothing differences in intensities; and $g_s$ is the spatial kernel for smoothing differences in coordinates.

At block 160, the computer system may perform the OCR of the reconstructed image to produce the text encoded by the symbols depicted by the image, and the method may terminate.

Figure 8:
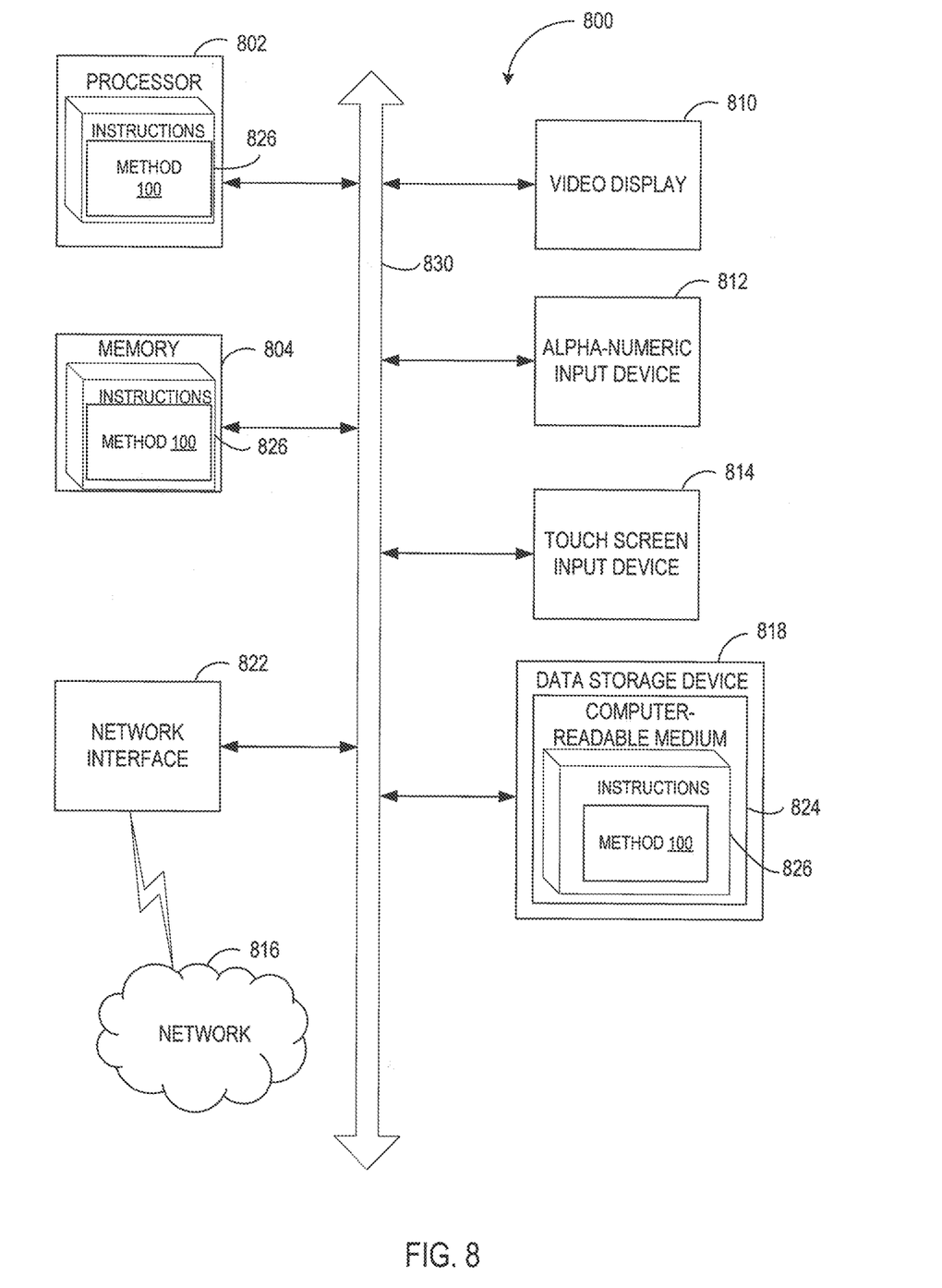
FIG. 8 depicts a component diagram of an example computer system which may execute instructions causing the computer system to perform any one or more of the methods discussed herein, may be executed.

FIG. 8 depicts a component diagram of an example computer system which may execute instructions causing the computer system to perform any one or more of the methods discussed herein, may be executed. The computer system 800 may be connected to other computer system in a LAN, an intranet, an extranet, or the Internet. The computer system 800 may operate in the capacity of a server or a client computer system in client-server network environment, or as a peer computer system in a peer-to-peer (or distributed) network environment. The computer system 800 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 800 includes a processor 802, a main memory 804 (e.g., read-only memory (ROM) or dynamic random access memory (DRAM)), and a data storage device 818, which communicate with each other via a bus 830.

Processor 802 may be represented by one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and functions of method 100 for performing OCR of a series of images comprising text symbols, as described herein above.

Computer system 800 may further include a network interface device 822, a video display unit 810, a character input device 812 (e.g., a keyboard), and a touch screen input device 814.

Data storage device 818 may include a computer-readable storage medium 824 on which is stored one or more sets of instructions 826 embodying any one or more of the methods or functions described herein. Instructions 826 may also reside, completely or at least partially, within main memory 804 and/or within processor 802 during execution thereof by computer system 800, main memory 804 and processor 802 also constituting computer-readable storage media. Instructions 826 may further be transmitted or received over network 816 via network interface device 822.

In certain implementations, instructions 826 may include instructions of method 100 for performing OCR of a series of images comprising text symbols, as described herein above. While computer-readable storage medium 824 is shown in the example of FIG. 8 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
receiving, by a computer system, a plurality of image frames, wherein each image frame of the plurality of image frames contains at least a part of an image of an original document;
identifying a plurality of visual features in the plurality of image frames;
performing spatial alignment of the plurality of image frames based on matching the identified visual features;
splitting each of the plurality of image frames into a plurality of image fragments;
identifying one or more text-depicting image fragments among the plurality of image fragments;
associating each identified text-depicting image fragment with an image frame in which that image fragment has an optimal value of a pre-defined quality metric among values of the quality metric for that image fragment in the plurality of image frames; and
producing a reconstructed image frame by blending image fragments from the associated image frames.

2. The method of claim 1, further comprising:
performing optical character recognition (OCR) of the reconstructed image frame.

3. The method of claim 1, further comprising:
post-processing the reconstructed image frame in an image area residing in a proximity of an inter-fragment border.

4. The method of claim 3, wherein post-processing the reconstructed image frame further comprises:
identifying a connected components residing in a proximity of an inter-fragment border;
associating each pixel of the connected component with a source image in which that pixel has a maximum sharpness;
selecting a source image that has been associated with a maximum number of connected component pixels; and
copying, from the identified source image, an image fragment covered by the connected component into the reconstructed image.

5. The method of claim 1, further comprising:
post-processing the reconstructed image frame to reduce a level of noise.

6. The method of claim 1, further comprising:
post-processing the reconstructed image frame to reduce differences in at least one of: image brightness or image contrast.

7. The method of claim 1, further comprising:
acquiring the plurality of image frames by a camera controlled by the computer system.

8. The method of claim 1, wherein the plurality of image frames comprises at least one of: a video frame or a still image frame.

9. The method of claim 1, wherein splitting each of the plurality of image frames into a plurality of image fragments further comprises:
determining one or more dimensions of an image fragment of the plurality of image fragments such that the image fragment comprises at least one of: at least a pre-defined number of text lines or at least a pre-defined number of symbols per line.

10. The method of claim 1, wherein the plurality of image fragments comprises two or more non-overlapping image fragments.

11. The method of claim 1, wherein the plurality of image fragments comprises two or more overlapping image fragments.

12. The method of claim 1, wherein the plurality of image frames comprises two or more image frames that differ by a position of an image acquiring device with respect to the original document.

13. The method of claim 1, wherein the plurality of image frames comprises two or more image frames that have been acquired under different image acquiring conditions.

14. The method of claim 1, further comprising:
performing binarization of the plurality of image frames.

15. The method of claim 1, wherein performing spatial alignment of the plurality of image frames further comprises:
applying a projective transformation to one or more image frames of the plurality of image frames.

16. The method of claim 1, wherein the image quality metric reflects at least one of: image sharpness, a level of noise within the image, image contrast, an optical distortion level, or presence of a certain visual artifact.

17. The method of claim 1, wherein the image quality metric is evaluated by a trainable classifier function that yields a degree of a certain aberration type detected within an image frame.

18. The method of claim 1, wherein the image quality metric is evaluated by a convolutional neural network that estimates OCR accuracy of an image.

19. A system, comprising:
a memory;
a processor, coupled to the memory, the processor configured to:
receive a plurality of image frames, wherein each image frame of the plurality of image frames contains at least a part of an image of an original document;
identify a plurality of visual features in the plurality of image frames;
perform spatial alignment of the plurality of image frames based on matching the identified visual features;
split each of the plurality of image frames into a plurality of image fragments;
identify one or more text-depicting image fragments among the plurality of image fragments;
associate each identified text-depicting image fragment with an image frame in which that image fragment has an optimal value of a pre-defined quality metric among values of the quality metric for that image fragment in the plurality of image frames; and
produce a reconstructed image frame by blending image fragments from the associated image frames.

20. A computer-readable non-transitory storage medium comprising executable instructions that, when executed by a processing device, cause the processing device to:
receive a plurality of image frames, wherein each image frame of the plurality of image frames contains at least a part of an image of an original document;
identify a plurality of visual features in the plurality of image frames;
perform spatial alignment of the plurality of image frames based on matching the identified visual features;
split each of the plurality of image frames into a plurality of image fragments;
identify one or more text-depicting image fragments among the plurality of image fragments;
associate each identified text-depicting image fragment with an image frame in which that image fragment has an optimal value of a pre-defined quality metric among values of the quality metric for that image fragment in the plurality of image frames; and
produce a reconstructed image frame by blending image fragments from the associated image frames.

* * * * *